July 18, 1944. A. R. GOULD 2,354,113
APPARATUS FOR COATING METALS AND SIMILAR MATERIALS
Filed Feb. 26, 1941

INVENTOR
Arthur R. Gould.
BY
ATTORNEY

Patented July 18, 1944

2,354,113

UNITED STATES PATENT OFFICE 2,354,113

APPARATUS FOR COATING METALS AND SIMILAR MATERIALS

Arthur R. Gould, Kansas City, Kans.

Application February 26, 1941, Serial No. 380,715

2 Claims. (Cl. 91—18)

This invention relates to an apparatus for coating the surfaces of metal with material capable of withstanding temperatures at which the surfaces soften under heat and particularly with an abrasive or granular material.

Other objects of the invention are to provide for rapidly heating the surface of the metal to a softened or plastic condition and pressing the coating material into the metal substantially at the point of heat; to provide a fluid vehicle for facilitating distribution of the material at the point of heating; and to effect substantially immediate cooling thereof so as to avoid distortion of the metal.

In accomplishing these and other objects of the invention, as hereinafter pointed out, I have provided improved apparatus, the preferred form of which is illustrated in the accompanying drawing, wherein Fig. 1 is a sectional view through an apparatus embodying the features of the present invention.

Figure 1:
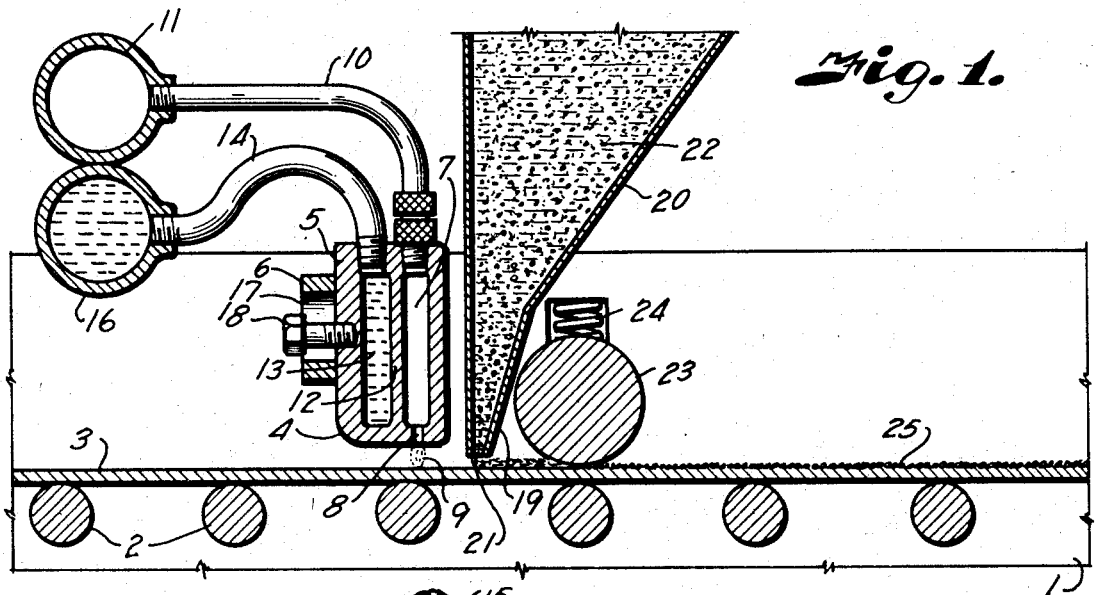

Referring more in detail to the drawing:

1 designates a continuous conveyor which may comprise a series of rollers 2 forming a table to convey a metal object, for example a sheet or plate 3, thereover at a predetermined speed, the rollers being suitably driven to carry the metal through a fixed path and under a heating torch 4 whereby a plurality of relatively small and intense flames is directed against a relatively small area with respect to the longitudinal direction of the metal and to bring the surface of the metal to the softening or melting point.

In the illustrated instance the torch or nozzle includes a series of sections 5, adjustably supported on a bar 6 extending transversely of the path of the metal and of sufficient number to cover the width thereof. Each section 5 includes a manifold chamber 7, having a series of jet orifices 8 in the bottom thereof as best shown in Fig. 2. The manifold 2 is supplied with a combustible mixture, such as oxygen and acetylene, which, when ignited, is capable of generating an intense flame at each of the orifices 8 as indicated at 9 in Fig. 1. In the illustrated instance, each section is supplied with the gas mixture through a branch duct 10 leading from a main supply pipe 11.

Figure 2:
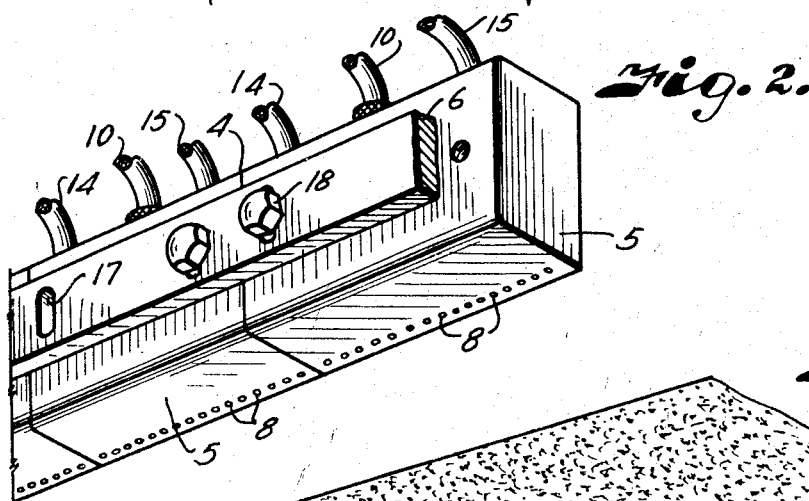
Fig. 2 is a fragmentary perspective view of the heating nozzle.
Figure 3:
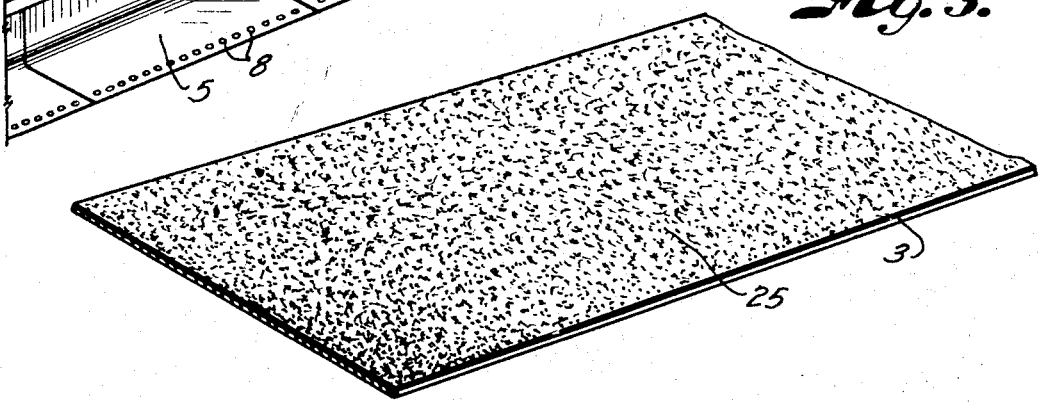
Fig. 3 is a perspective view of a sheet of metal treated in accordance with the present invention.
Figure 4:
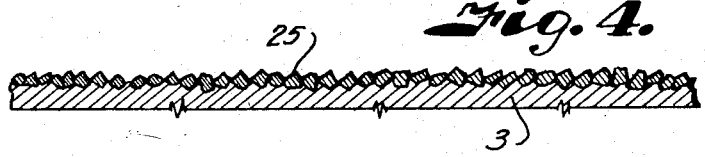
Fig. 4 is a highly enlarged sectional view through the metal showing particles of granular material imbedded therein to provide a rough or abrasive surface.

Associated with the manifold chamber 7, and separated therefrom by a partition 12, is a cooling chamber 13 through which a cooling medium is circulated to resist overheating of the nozzle sections, the cooling medium being circulated through branch pipes 14 and 15 connected with a manifold pipe 16 as shown in Fig. 1.

As mentioned above, the sections 5 are adjustably supported on the bar 6 to space the jets with respect to the surface of the metal to be coated, the adjustment being effected by providing the bar 6 with elongated slots 17 through which fastening devices, such as cap-screws 18, are extended to clamp the sections to the bar upon tightening of the screws.

Located substantially adjacent the nozzle sections, and in position to carry coating material onto the metal while the surface thereof is in softened or molten condition, is the nozzle 19 of a hopper 20, the nozzle 19 having an outlet 21 so that the material 22 is directed onto the metal and evenly distributed thereacross responsive to fluidity of a vehicle in which the coating material is carried.

While various vehicles may be used, depending upon the character of the material to be applied, I find silicate of soda or water glass to be most practical in applying abrasive materials, such as carborundum, various crystals and similar solid particles. In applying other materials, vehicles such as molten metals may be utilized, the point being to provide a vehicle wherein the specific gravity of the particles to be applied permits their uniform distribution so that they are evenly distributed across the surface of the heated metal. Upon contacting the hot metal, the vehicle is substantially instantaneously disbursed so that the particles settle on the heated metal and are pressed thereinto by a roller 23, the roller 23 being preferably yieldingly mounted and urged in pressing contact by springs 24. The pressure of the springs is such as to press the coating particles 25 into the metal without materially crushing thereof. By the time the metal has passed the pressing roller, the metal is substantially cool so as to avoid any deformation incidental to heating thereof.

While various metals may be used to coat the metal, I particularly contemplate steel shot, metal filings, gravel, glass particles, various crystals, carborundum, emery, silica, aloxite, alundum, and products of bauxite. It is also possible to apply materials of various colors to provide designs on the surface of the metal.

While the metal may be heated to various temperatures, it is contemplated to heat it only sufficiently to render it plastic to a depth sufficient for bedding the particles without materially crushing or breaking thereof and to immediately cool the metal. The points of heating and application of the particles are relatively close together so that only a small area is under treatment incidental to passage of the metal thereunder.

The invention also contemplates fixed support for the metal to be coated and a movable carriage for the heating and coating applying elements.

The invention also contemplates coating of various terne plate or plated metals by softening the plating material and imbedding the coating material therein.

The method may be used in coating any shape or form of metal, such as flat metal sheets, grating, plates, structural members, treads of stairs, walk-ways, and the like.

The process is also adapted for applying abrasive material to wheels, sanding belts, etc.

From the foregoing it is obvious that I have provided a continuous method of applying coating materials of the character described to metal surfaces, and that the coating particles are imbedded into the metal so that they are retained therein and not readily dislodged.

What I claim and desire to secure by Letters Patent is:

1. Apparatus for coating metal with particles of solid material including, means supporting the metal for movement in a fixed path, a plurality of jets arranged in a lateral alignment to direct a plurality of flames onto the surface of the metal, means for spreading the particles onto the heated metal, and means for pressing the particles into the metal while the surface of the metal is in plastic condition.

2. Apparatus for coating metal with particles of solid material including, means supporting the metal for movement in a fixed path, a torch having a plurality of closely arranged laterally aligned outlet orifices for maintaining a substantially narrow line of flame transversely of the surface to be coated, means for feeding said particles including, a liquid vehicle onto the heated metal for spreading the particles onto said heated metal, and means for pressing the particles into the metal.

ARTHUR R. GOULD.